US012611011B1

(12) United States Patent
Cretella et al.

(10) Patent No.: US 12,611,011 B1
(45) Date of Patent: Apr. 28, 2026

(54) FABRIC WITH INTEGRATED COMPONENTS

(71) Applicant: Apple Inc., Cupertino, CA (US)

(72) Inventors: Kristen L. Cretella, Mountain View, CA (US); Jessica J. Lu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1576 days.

(21) Appl. No.: 16/932,619

(22) Filed: Jul. 17, 2020

Related U.S. Application Data

(60) Provisional application No. 62/907,041, filed on Sep. 27, 2019.

(51) Int. Cl.
| | |
|---|---|
| *A44C 5/00* | (2006.01) |
| *A44C 5/14* | (2006.01) |
| *D03D 1/00* | (2006.01) |
| *D03D 15/56* | (2021.01) |
| *D04B 1/18* | (2006.01) |
| *D04B 1/22* | (2006.01) |
| *D04B 21/16* | (2006.01) |
| *G06F 1/16* | (2006.01) |

(52) U.S. Cl.
CPC .............. *A44C 5/0053* (2013.01); *A44C 5/00* (2013.01); *A44C 5/14* (2013.01); *D03D 15/56* (2021.01); *D04B 1/18* (2013.01); *G06F 1/1607* (2013.01); *G06F 1/163* (2013.01); *B32B 2307/202* (2013.01); *B32B 2307/51* (2013.01); *B32B 2307/72* (2013.01); *D03D 1/00* (2013.01); *D04B 1/22* (2013.01); *D04B*

*21/16* (2013.01); *D10B 2401/18* (2013.01); *D10B 2403/021* (2013.01); *D10B 2403/02431* (2013.01); *D10B 2403/033* (2013.01)

(58) Field of Classification Search
CPC .......................... A44C 5/18–5/246; A44C 5/00
See application file for complete search history.

(56) References Cited

U.S. PATENT DOCUMENTS

| | | | | |
|---|---|---|---|---|
| 9,578,903 B2 * | 2/2017 | Cobbett | ............... | A61B 5/4866 |
| 9,877,549 B2 | 1/2018 | Perkins et al. | | |
| 10,085,523 B2 | 10/2018 | Perkins et al. | | |
| 10,427,374 B2 | 10/2019 | Hamada et al. | | |
| 10,595,618 B2 | 3/2020 | Wang et al. | | |
| 11,076,664 B1 * | 8/2021 | Podhajny | ................ | D03D 3/08 |

(Continued)

*Primary Examiner* — Jennifer A Steele

(74) *Attorney, Agent, or Firm* — Treyz Law Group, P.C.; Kendall P. Woodruff

(57) ABSTRACT

A fabric-based item may include fabric with embedded components. The components may be mechanical components such as an attachment module for removably coupling the fabric-based item to an electronic device housing, and/or the components may be electrical components that are soldered or otherwise electrically coupled to conductive strands in the fabric—based item. Components may be inserted into pockets in the fabric. Regions of the fabric with components may have different properties than regions of the fabric without components. For example, regions with components may be more rigid, less porous, and/or less stretchy than regions without components. Fabric construction and/or fabric materials may change as the fabric transitions from a component-free region to a component region. Components may have alignment features that help align other parts relative to the components.

18 Claims, 6 Drawing Sheets

(56) References Cited

U.S. PATENT DOCUMENTS

2008/0271298 A1* 11/2008 Meager ..................... A41F 1/00
                                                                24/589.1
2016/0000374 A1*  1/2016 Dandekar ............ A61B 5/0024
                                                                600/587
2016/0025119 A1*  1/2016 Russell-Clarke .... A43B 1/0054
                                                                24/303
2016/0040698 A1*  2/2016 Perkins ................ A44C 5/2085
                                                                24/664
2016/0058375 A1*  3/2016 Rothkopf ............. G04G 21/025
                                                                600/323
2016/0258084 A1*  9/2016 Hatanaka ............... D03D 3/005
2018/0042368 A1   2/2018 Mayer et al.
2022/0338580 A1* 10/2022 Stockinger ................ A41F 9/00

* cited by examiner

FABRIC-BASED ITEM — 10

FABRIC, MONOFILAMENTS, YARN, ETC. — 12

ADDITIONAL MECHANICAL STRUCTURES (E.G., BINDER, SUPPORT STRUCTURES, HOUSING STRUCTURES, ETC.) — 14

CIRCUITRY (E.G., CONTROL CIRCUITS, LIGHT-EMITTING DIODES, SENSORS, BATTERIES, AUDIO COMPONENTS, SWITCHES, CONNECTORS, ETC.) — 16

ADDITIONAL ITEMS (E.G., ELECTRONIC EQUIPMENT) — 18

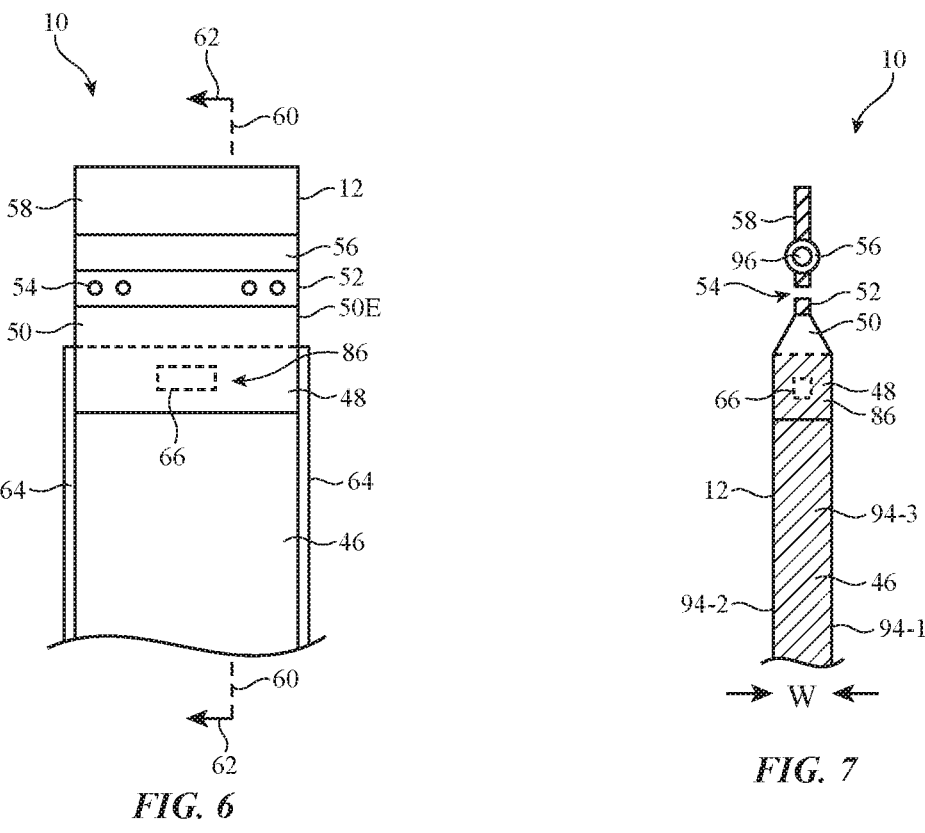
FIG. 6
FIG. 7
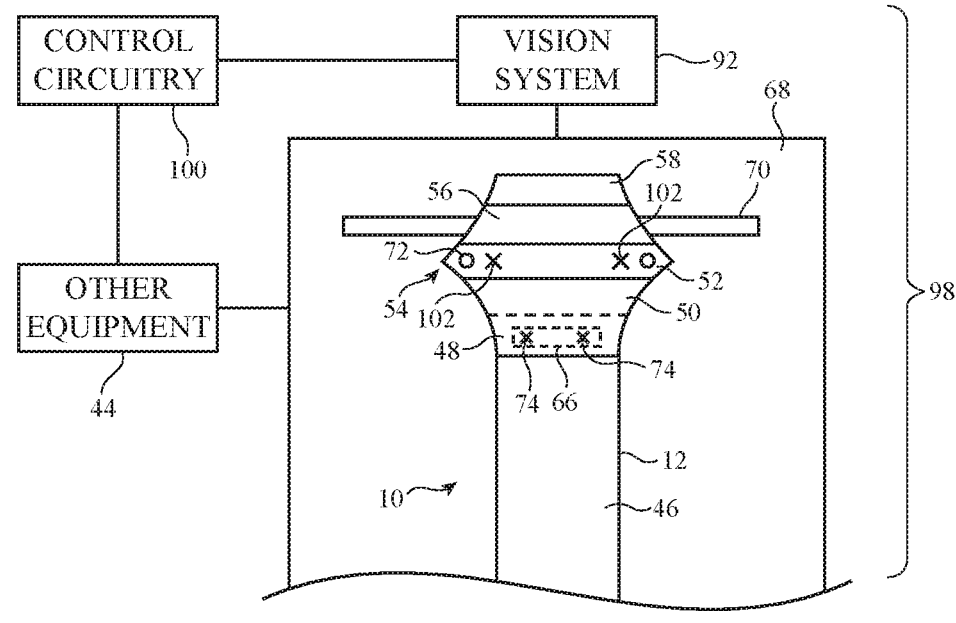
FIG. 8

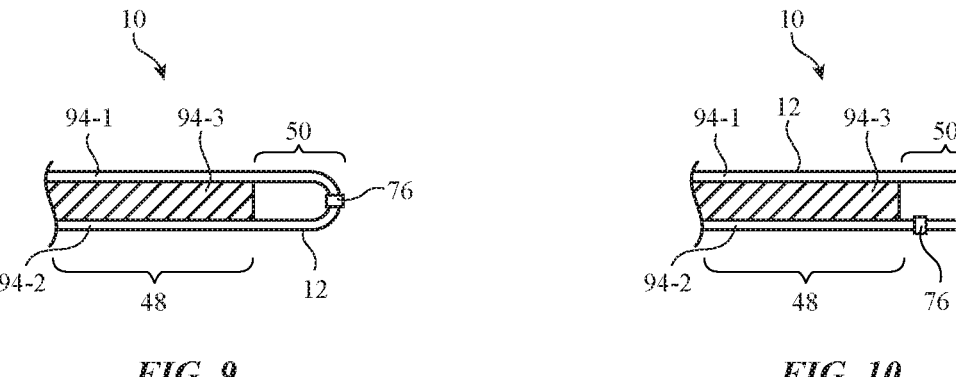
*FIG. 9*                    *FIG. 10*
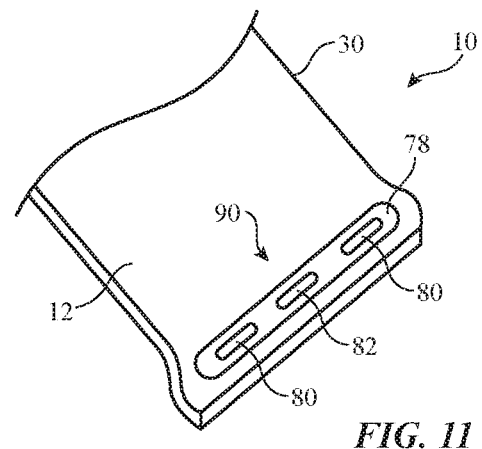
*FIG. 11*
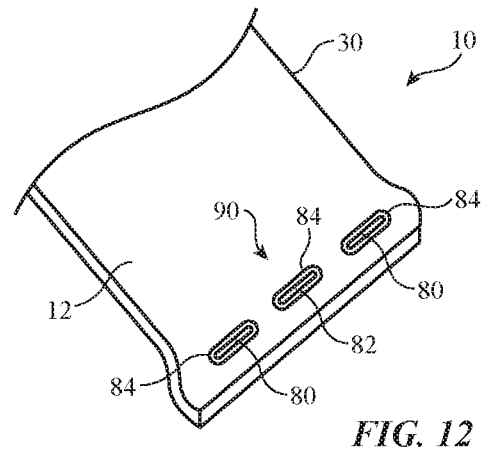
*FIG. 12*

FABRIC WITH INTEGRATED COMPONENTS

This application claims the benefit of U.S. provisional patent application No. 62/907,041, filed Sep. 27, 2019, which is hereby incorporated by reference herein in its entirety.

FIELD

This relates generally to fabric-based items and, more particularly, to fabric-based items with integrated components.

BACKGROUND

It may be desirable to form cases, straps, electronic devices, clothing, and other items using materials such as fabric. If care is not taken, however, fabric-based items such as these may not offer desired features. For example, fabric items may not offer the desired functionality, may not wear well, may be bulky, or may have an undesirable appearance.

SUMMARY

A fabric-based item may include fabric with embedded components. The components may be mechanical components such as an attachment module for removably coupling the fabric-based item to an electronic device housing, and/or the components may be electrical components that are soldered or otherwise electrically coupled to conductive strands in the fabric—based item. Components may be inserted into pockets in the fabric.

Regions of the fabric with components may have different properties than regions of the fabric without components. For example, regions with components may be more rigid, less porous, and/or less stretchy than regions without components. Fabric construction and/or fabric materials may change as the fabric transitions from a component-free region to a component region. Components may have alignment features that help align other parts relative to the components. Polymer material may be used to seal the pocket and/or to increase rigidity in component regions.

An attachment module in a fabric strap may include components on the exterior surface of the fabric and components that are embedded within of the fabric. The interior components may have alignment features that help align the exterior components with respect to the interior components. For example, the fabric may be debossed (or otherwise formed using heat and/or pressure) using the interior component alignment features as datums, and the exterior components may be mounted in debossed regions. Interior components of the attachment module may include a metal member (e.g., a metal injection molded structure) and exterior components of the attachment module may include a trim member with one or more openings for a spring member and one or more friction pads. The exterior components may be welded or otherwise coupled to the interior components through the fabric.

BRIEF DESCRIPTION OF THE DRAWINGS

FIG. 6 is a top view of an illustrative fabric-based item in which regions with embedded components have different properties than regions without embedded components.

FIG. 7 is a cross-sectional side view of the fabric-based item of FIG. 6 in accordance with an embodiment.

FIG. 8 is a diagram of illustrative processing equipment that may be used to incorporate components into a fabric-based item in accordance with an embodiment.

FIGS. 9 and 10 are cross-sectional side views of illustrative seam configurations for a fabric-based item in accordance with embodiments.

FIG. 11 is a perspective view of an illustrative fabric-based item such as a strap having an attachment module with a trim member surrounding a spring member and friction pads in accordance with an embodiment.

FIG. 12 is a perspective view of an illustrative fabric-based item such as a strap having an attachment module with individual trim members surrounding a spring member and friction pads in accordance with an embodiment.

DETAILED DESCRIPTION

Figure 1:
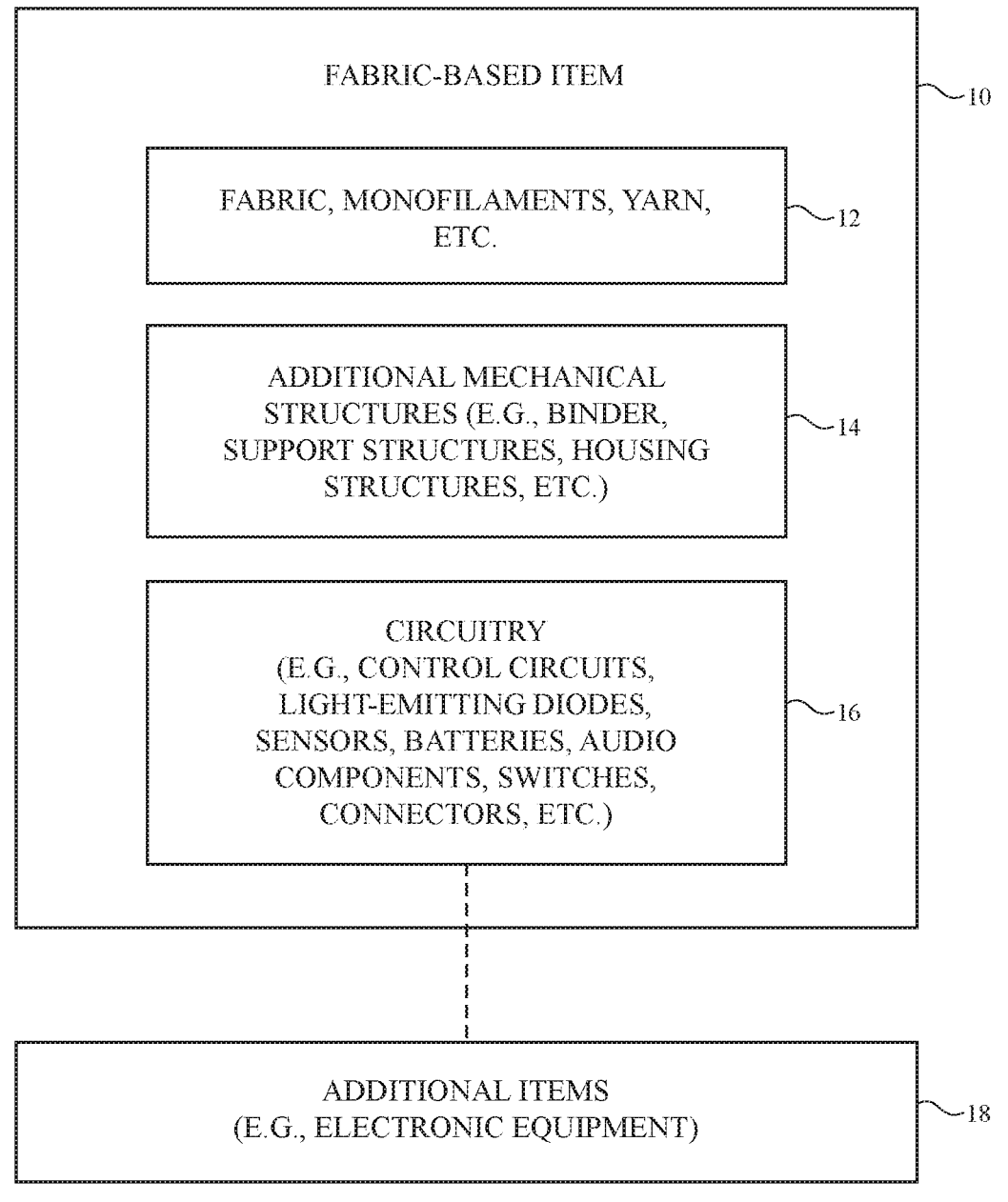
FIG. 1 is a schematic diagram of an illustrative fabric-based item in accordance with an embodiment.

Items such as item 10 of FIG. 1 may be based on fabric. Item 10 may be an electronic device or an accessory for an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a remote control, a navigation device, an embedded system such as a system in which fabric-based item 10 is mounted in a kiosk, in an automobile, airplane, or other vehicle, other electronic equipment, or may be equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, sock, glove, shirt, pants, etc.), or may be any other suitable fabric-based item.

Item 10 may include intertwined strands of material that form fabric 12. Fabric 12 may form all or part of a housing wall or other layer in an electronic device, may form an outer covering for a housing wall structure, may form internal structures in an electronic device, or may form other fabric-based structures. Item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

The strands of material in fabric 12 may be single-filament strands (sometimes referred to as fibers or mono-filaments), may be yarns or other strands that have been formed by intertwining multiple filaments (multiple mono-filaments) of material together, or may be other types of strands (e.g., tubing). Monofilaments for fabric 12 may include polymer monofilaments and/or other insulating monofilaments and/or may include bare wires and/or insulated wires. Monofilaments formed from polymer cores with metal coatings and monofilaments formed from three or more layers (cores, intermediate layers, and one or more outer layers each of which may be insulating and/or conductive) may also be used.

Strands in fabric 12 may be formed from polymer, metal, glass, graphite, ceramic, natural materials as cotton or bamboo, or other organic and/or inorganic materials and combinations of these materials. Conductive coatings such as metal coatings may be formed on non-conductive material. For example, plastic strands and monofilaments in fabric 12 may be coated with metal to make them conductive. Reflective coatings such as metal coatings may be applied to make strands and monofilaments reflective. Strands may be formed from a bundle of bare metal wires or metal wire intertwined with insulating monofilaments (as examples).

Strands of material may be intertwined to form fabric 12 using intertwining equipment such as weaving equipment, knitting equipment, or braiding equipment. Intertwined strands may, for example, form woven fabric, knit fabric, braided fabric, etc. Conductive strands and insulating strands may be woven, knit, braided, or otherwise intertwined to form contact pads that can be electrically coupled to conductive structures in item 10 such as the contact pads of an electrical component. The contacts of an electrical component may also be directly coupled to an exposed metal segment along the length of a conductive yarn or monofilament.

Conductive and insulating strands may also be woven, knit, or otherwise intertwined to form conductive paths. The conductive paths may be used in forming signal paths (e.g., signal buses, power lines, etc.), may be used in forming part of a capacitive touch sensor electrode, a resistive touch sensor electrode, or other input-output device, or may be used in forming other patterned conductive structures. Conductive structures in fabric 12 may be used in carrying power signals, digital signals, analog signals, sensor signals, control signals, data, input signals, output signals, or other suitable electrical signals.

Item 10 may include additional mechanical structures 14 such as polymer binder to hold strands in fabric 12 together, support structures such as frame members, housing structures (e.g., an electronic device housing), attachment structures (e.g., pins, lugs, bumpers, clips, rods, snaps, screws, buckles, etc.), and other mechanical structures.

Item 10 may include circuitry 16. Circuitry 16 may include electrical components that are coupled to fabric 12, electrical components that are housed within an enclosure formed by fabric 12 and/or an enclosure formed using other housing structures such as housing walls formed from plastic, metal, glass, ceramic, or other materials, electrical components that are attached to fabric 12 using welds, solder joints, adhesive bonds (e.g., conductive adhesive bonds such as anisotropic conductive adhesive bonds or other conductive adhesive bonds), crimped connections, or other electrical and/or mechanical bonds. Circuitry 16 may include metal structures for carrying current, electrical components such as integrated circuits, light-emitting diodes, sensors, controller circuitry for applying currents and/or magnetic fields to materials, and other electrical devices. Control circuitry in circuitry 16 (e.g., control circuitry formed from one or more integrated circuits such as microprocessors, microcontrollers, application-specific integrated circuits, digital signal processors, etc.) may be used to gather information from user input circuitry, sensing circuitry such as touch sensors, force sensors, proximity sensors, and other sensing circuitry, and other input-output circuits. The control circuitry may be used to control the operation of item 10 based on this gathered information and/or based on other information by controlling electrically controllable (electrically adjustable) components in circuitry 16. The control circuitry may have wireless communications circuitry and other communications circuitry and may be used in supporting communications with item 18 and/or other devices.

Item 10 may interact with electronic equipment or other additional items 18. Items 18 may be attached (e.g., permanently attached or removably attached) to item 10, may be part of item 10, and/or item 10 and item 18 may be separate items that are configured to operate with each other (e.g., when one item such as item 18 is a wrist-watch and another item such as item 10 is a band that attaches the wrist-watch to a user's wrist, when one item is a case and the other is a device that fits within the case, when one item such as item 10 is a remote control and another item such as item 18 is an electronic device that is controlled by the remote control such as a set-top box, television, computer, gaming unit, speaker, or other electronic equipment that is controlled remotely, etc.). Circuitry 16 may include wireless communications circuitry such as antennas, wireless radio-frequency transceivers (e.g., transceivers operating at 2.4 GHz, 5 GHZ, and/or other wireless communications frequencies) and other electrical components for supporting wireless communications with item 18. The wireless communications circuitry may include communications circuitry based on infrared transmitters such as infrared light-emitting diodes or lasers for transmitting infrared commands to electronic equipment such as item 18. Item 18 may also interact with item 10 using a wired communications link or other connection that allows information to be exchanged.

In some situations, item 18 may be an electronic device such as a cellular telephone, computer, or other portable electronic device and item 10 may form a cover, case, bag, or other structure that receives the electronic device in a pocket, an interior cavity, or other portion of item 10.

In other situations, item 18 may be a wrist-watch device or other electronic device and item 10 may be a strap or other fabric-based item that is attached to item 18 (e.g., item 10 and item 18 may be used together to form a fabric-based item such as a wrist-watch with a strap). Item 10 may also be a cellular telephone, tablet computer, wearable device, voice-controlled speaker, or other equipment.

In still other situations, item 10 may be an electronic device such as a fabric-covered remote control device (e.g., a fabric-covered remote control that has a majority of its surface or other suitable fraction of its surface covered with fabric 12). The remote control device may be used in controlling external electronic equipment (e.g., item 18).

The fabric that makes up item 10 may be formed from strands that are intertwined using any suitable intertwining equipment. With one suitable arrangement, which may sometimes be described herein as an example, fabric 12 may be knit fabric (e.g., a knit spacer fabric, a flat knit fabric, a circular knit tube, a warp knit fabric, etc.) formed using a knitting machine. In other suitable arrangements fabric 12 may be a braided fabric or a woven fabric (e.g., a fabric having a plain weave, a basket weave, a satin weave, a twill weave, or variations of these weaves, a three-dimensional woven fabric, or other suitable fabric). If desired, signal paths formed from conductive yarns and monofilaments (e.g., insulated and bare wires) may be used to route signals in item 10 and/or item(s) 18.

Figure 2:
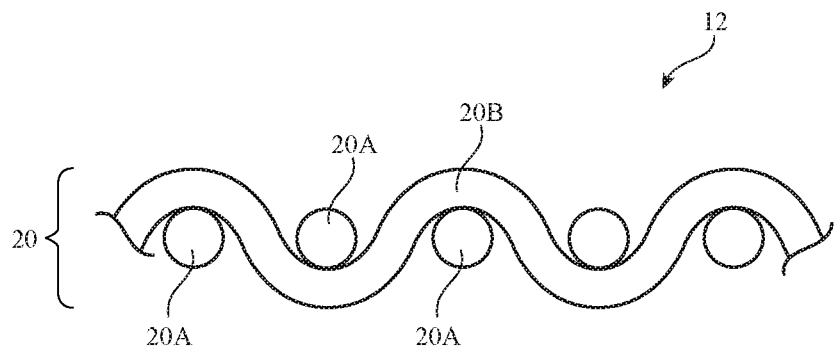
FIG. 2 is a side view of illustrative woven fabric in accordance with an embodiment.

A cross-sectional side view of illustrative woven fabric 12 is shown in FIG. 2. As shown in FIG. 2, fabric 12 may include strands 20 such as warp strands 20A and weft strands 20B. In the illustrative configuration of FIG. 2, fabric 12 has a single layer of woven strands 20. Multi-layer fabric constructions may be used for fabric 12 if desired.

Figure 3:
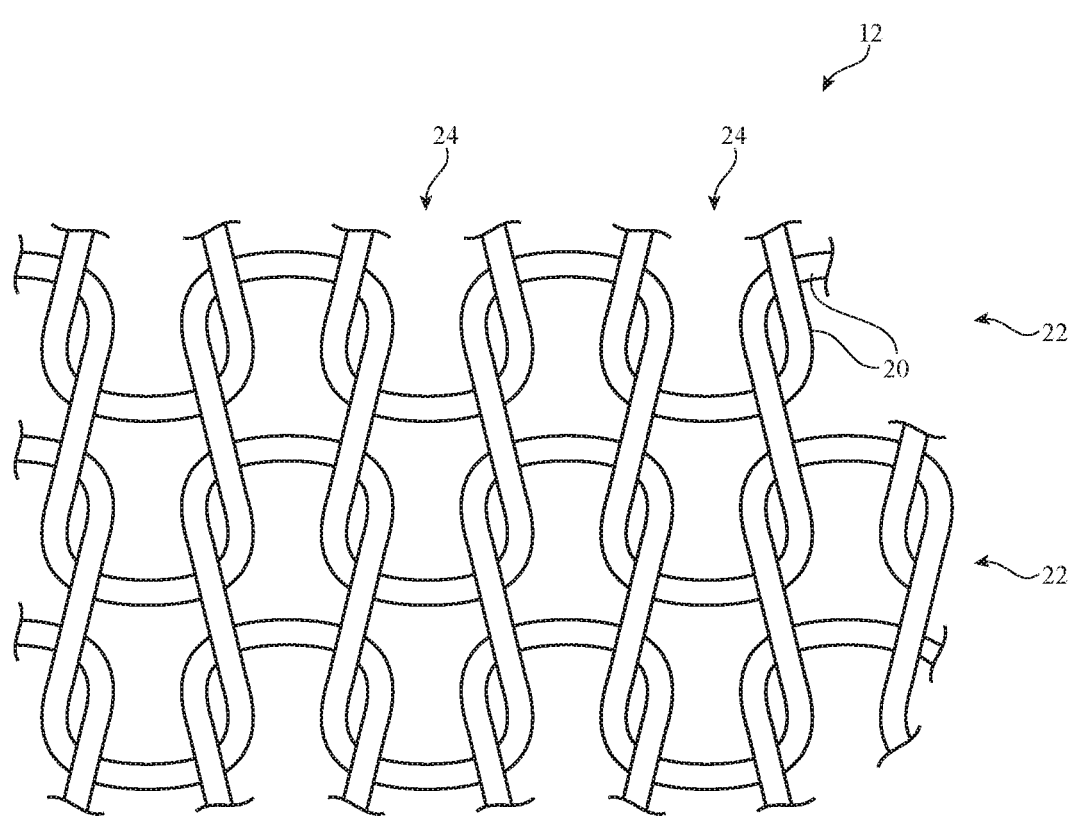
FIG. 3 is a top view of illustrative knit fabric in accordance with an embodiment.

As shown in FIG. 3, fabric 12 may be a knit fabric. In the illustrative configuration of FIG. 3, fabric 12 has a single layer of knit strands 20 that form horizontally extending rows of interlocking loops (courses 22) and vertically extending wales 24. Other types of knit fabric may be used in item 10, if desired.

In some arrangements, fabric 12 may include a spacer fabric having first and second outer layers (e.g., warp knit or weft knit layers of the type shown in FIG. 2) joined by a spacer layer. The spacer layer may include strands that intertwine the first and second outer layers together. Spacer fabrics may have an air-filled space between the outer layers that gives fabric 12 a cushiony feel and allows fabric 12 to absorb mechanical stresses (and still be able to return to its original shape).

Arrangements in which fabric 12 includes two or more different types of fabric constructions may also be used. For example, fabric 12 may be formed from a spacer fabric in one region and a single layer fabric in another region, if desired. Using different types of fabric constructions in different regions of fabric 12 may be useful for incorporating components such as structural components 14 and/or circuitry 16. This is merely illustrative, however. If desired, item 10 may have uniform fabric construction throughout fabric 12, may include mesh fabric, and/or may include any other suitable type of fabric construction.

Fabric-based item 10 may include non-fabric materials (e.g., structures such as structures 14 that are formed from plastic, metal, glass, ceramic, crystalline materials such as sapphire, etc.). These materials may be formed using molding operations, extrusion, machining, laser processing, and/or other fabrication techniques and may be used in forming housing structures, coupling structures (e.g., for coupling item 10 to device 18), internal mounting structures, buttons, portions of display components and other electronic components, and/or other structures in item 10. In some configurations, some or all of fabric-based item 10 may include one or more layers of material. The layers in item 10 may include layers of polymer, metal, glass, fabric, adhesive, crystalline materials, ceramic, substrates on which components have been mounted, patterned layers of material, layers of material containing patterned metal traces, thin-film devices such as transistors, and/or other layers.

Figure 4:
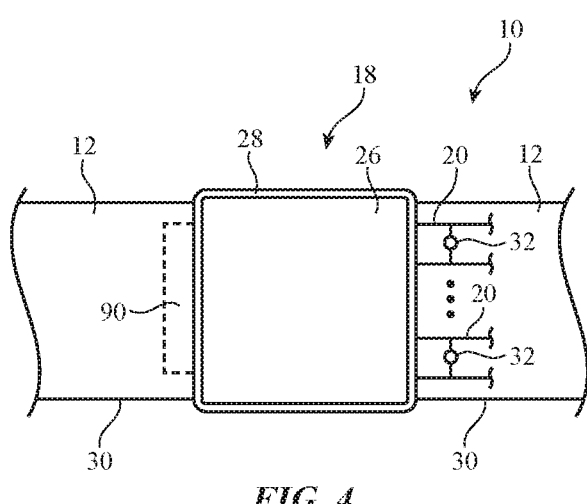
FIG. 4 is a top view of an illustrative fabric-based item such as a strap that is coupled to an electronic device in accordance with an embodiment.

FIG. 4 is a top view of an illustrative fabric-based item such as item 10 of FIG. 1 that has been coupled to an electronic device such as electronic device 18 of FIG. 1. As shown in FIG. 4, device 18 may have a display such as display 26 and other electrical components mounted in a housing such as housing 28. Device 18 may be a portable electronic device such as a device that is mounted on a user's wrist, arm, leg, head, torso, or other body part. Device 18 may, for example, be a wrist-mounted device such as a wristwatch, a health monitoring device, a media player, a wireless key, or other electronic device and/or equipment that includes the functions of two or more of these devices or other suitable devices. Housing 28 (e.g., a watch housing in scenarios in which device 18 is a wristwatch) may be formed from metal, ceramic, plastic, glass, sapphire or other crystalline materials, and/or other suitable materials. Housing 28 may have a rectangular outline, may have an oval or circular shape, or may have other suitable shapes. Display 26 may be a liquid crystal display, an organic light-emitting diode display, or other suitable display.

In the example of FIG. 4, fabric-based item 10 is coupled to device 18 and forms a strap such as strap 30. Strap 30 may have portions attached to opposing sides of housing 28. Strap 30 may, for example, have an attachment module such as attachment module 90 that couples strap 30 to housing 28. Attachment module 90 may be located on one or both of the opposing sides of housing 28. Attachment module 90 may include one or more spring pins, friction pads, openings, lugs, protrusions, magnets, clasps, snaps, clips, and/or other attachment structures. In one illustrative arrangement, attachment module 90 may slide laterally into a recess or channel in housing 28 and may include a locking mechanism that locks strap 30 in place relative to housing 28 when attachment module 90 slides into the appropriate location relative to housing 28. This is merely illustrative, however. If desired, attachment module 90 may be snap fit, press fit, or otherwise coupled to housing 28. The locking mechanism in attachment module 90 may be released to remove strap 30 from housing 28 using one or more actuators in strap 30 and/or in device 18. Attachment module 90 be formed from metal, injection molded metal, glass, carbon fiber, plastic, elastomer, glass-reinforced plastic, ceramic, crystalline materials such as sapphire, and/or other materials.

In some arrangements, strap 30 may include first and second portions joined by a clasp (e.g., joined by hook-and-loop fasteners, a buckle, or other suitable clasp to secure strap 30 about the wrist or other body part of a user). In other arrangements, strap 30 may be a single piece that extends continuously between first and second ends and respectively coupled to first and second opposing sides of housing 28. If desired, strap 30 may be stretchable to accommodate different wrist sizes.

Strap 30 may include strands of material that are knit, woven, or otherwise intertwined together. Strands 20 that are intertwined to form strap 30 may be monofilaments and/or multifilament yarns. Strap 30 may contain insulating strands of material and/or conductive strands of material. Insulating strands may be formed from dielectric materials such as polymers. Conductive strands may be formed from metal wires or may be formed from one more conductive layers of material such as metal layers on polymer cores or other polymer layers. Conductive strands may also be formed by mixing conductive filaments with insulating filaments. Conductive strands may have insulating coatings.

If desired, strap 30 may contain electrical components such as components 32. Components 32 (which may form part of circuitry 16 of FIG. 1) may include sensors, buttons, light-emitting diodes, batteries, antennas, integrated circuits, vibrators and other actuators, and/or other input-output devices. Strands 20 may include conductive strands for routing power and data signals between components 32 within strap 30 and between components such as component 32 in strap 30 and circuitry in housing 28. Components 32 may be soldered or otherwise electrically coupled to conductive strands in fabric 12.

Figure 5:
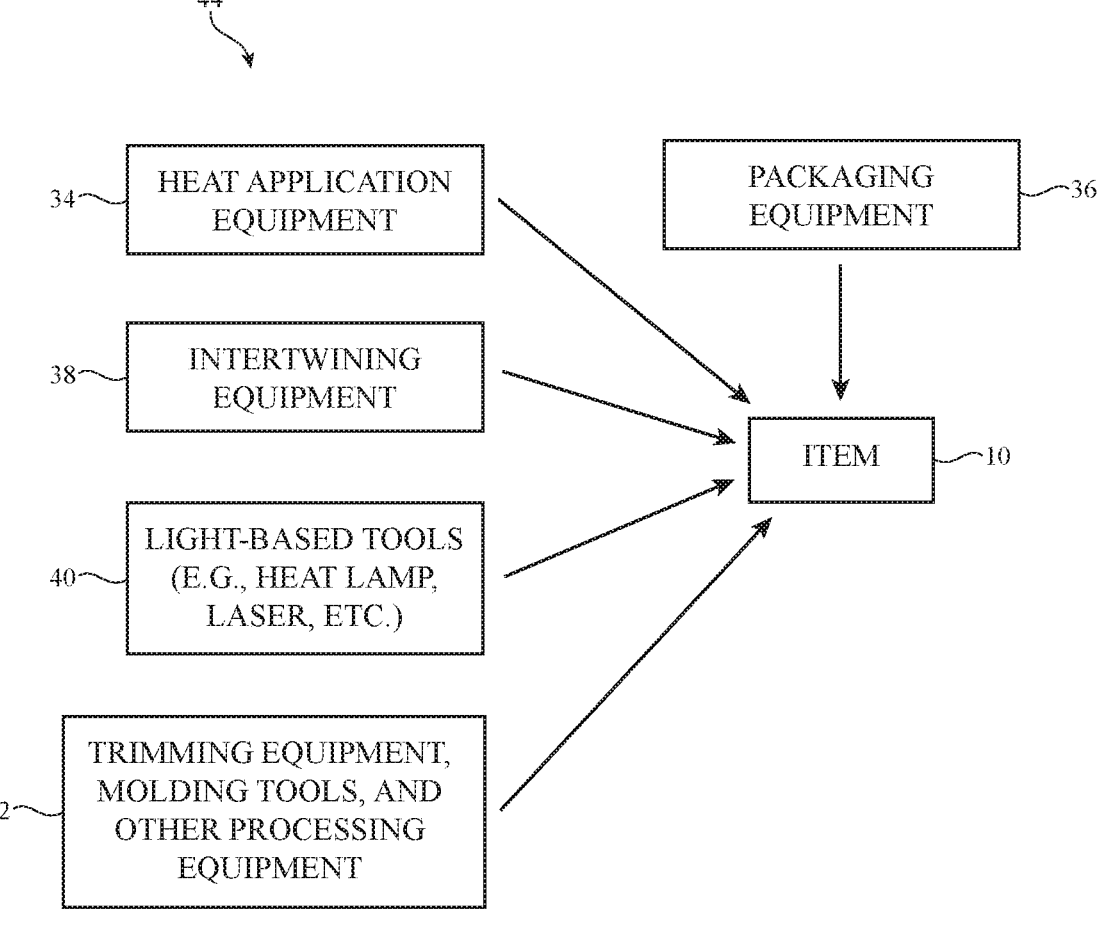
FIG. 5 is a diagram of illustrative equipment that may be used to form and process a fabric-based item in accordance with an embodiment.

FIG. 5 is a diagram of illustrative equipment such as equipment 44 that may be used in forming and processing fabric-based item 10. As shown in FIG. 5, equipment 44 may include equipment for applying heat to item 10 such as equipment 34. Equipment 34 may include a heated fixture that applies heat and pressure, a hot bar tool, an induction heating tool, or other tool that produces heat to soften, melt, cure, or otherwise modify item 10. A hot bar tool may include a heated metal member that can be placed into contact with a portion of item 10. Heated embossing equipment (e.g., heated metal die structures that can be used to emboss or deboss a desired pattern onto a layer of fabric or other material that is compressed between the die structures) and/or other heated structures may be included in equipment 34.

Packaging equipment 36 may include a soldering tool (e.g., a pick and place tool or other equipment for soldering integrated circuits and other components to conductive strands in fabric 12 in item 10). Equipment 36 may also include injection molding equipment, an encapsulation tool, or other equipment for molding or otherwise forming desired encapsulation layer structures (mold caps) on circuits 16 of item 10. Equipment 36 may, for example, include equipment for depositing liquid polymer material that forms a solid encapsulation layer after cooling and/or curing.

Intertwining equipment such as tool (equipment) 38 may include equipment such as weaving equipment, knitting equipment, and/or braiding equipment. Tool 38 may be used in forming fabric 12 from strands of material (e.g., strands 20).

Light-based tools 40 may also be used to process item 10. Tools 40 may include sources of light such as lasers, light-emitting diodes, and lamps. Tools 40 may emit ultraviolet light, visible light, and/or infrared light. The light emitted by tools 40 may include wide area illumination and/or focused beams. Light may be emitted continuously (e.g., using a continuous wave laser) or may be emitted in pulses (e.g., to perform laser ablation operations). Tools 40 may emit laser pulses having durations of Oct. 15, 2010-12 seconds, Oct. 15, 2010-9 seconds, longer than on picosecond, shorter than one picosecond, longer than one nanosecond, shorter than one nanosecond, between one femtosecond and one millisecond, or other suitable durations. Short pulses may have high energy densities and may be suitable for ablating (vaporizing) polymers and other materials without melting nearby structures. Short pulses, longer duration pulses, and/or continuous wave light beams may be used in softening and/or melting polymers and other materials. Lasers in equipment 40 may be used to cut fabric 12 (e.g., via laser ablation), to form perforations in fabric 12, and/or to laser weld components to fabric 12.

If desired, item 10 may be processed using additional tools 42 such as trimming equipment (e.g., cutting tools for trimming fabric), machining tools (e.g., a milling machine, drill, grinding equipment, etc.), molding tools (e.g., plastic injection molding tools and other equipment for molding plastic), tumbling equipment (e.g., equipment for softening fabric), chemical baths (e.g., for electroplating, for modifying the surfaces of item 10, for etching, etc.), printing equipment (e.g., screen printing tools, inkjet printing tools, etc.), photolithographic tools, ovens, cutting tools, and/or other equipment for processing item 10.

Equipment 44 may be used to couple components such as mechanical components 14 and/or electrical components 16 to fabric 12. For example, electrical components such as components 32 of FIG. 4 and/or mechanical components such as attachment module 90 of FIG. 4 may be embedded in, inserted into, mounted to, or otherwise coupled to fabric 12.

To accommodate components in fabric 12, fabric 12 may have different regions with different properties. For example, regions of fabric that do not include components (sometimes referred to as component-free regions) may be more flexible and/or more porous, whereas regions with components (sometimes referred to as component regions) may be more rigid and/or may incorporate more thermoplastic to provide environmental protection. Other regions of fabric 12 may incorporate alignment features (sacrificial or non-sacrificial alignment features for aligning components to fabric 12 and/or for aligning fabric 12 to a tool during manufacturing).

FIG. 6 is a top view of an illustrative fabric-based item 10 having fabric 12 with one or more properties that vary across the fabric. Arrangements in which fabric 12 of FIG. 6 forms a strap for a wrist-watch (e.g., strap 30 of FIG. 4) are sometimes described herein as an example. If desired, fabric 12 may be used to form other fabric-based items.

Components such as component 66 may be incorporated into fabric 12. Component 66 may be an electrical component (e.g., component 32 of FIG. 4 and/or other circuitry 16), may be a mechanical component (e.g., attachment module 90 of FIG. 4 and/or other mechanical component 14), and/or may be a component that incorporates both electrical and mechanical functionality. Component 66 may be mounted between outer fabric layers (e.g., embedded in a spacer fabric layer and/or located in a pocket in fabric 12). Component 66 may be inserted into fabric 12 during the formation of fabric 12 (e.g., while intertwining equipment 38 is knitting, weaving, or otherwise intertwining strands 20 to form fabric 12) or component 66 may be inserted into fabric 12 after fabric 12 has been formed (e.g., after fabric 12 has been removed from the knitting machine, weaving machine, or other intertwining tool).

As shown in FIG. 6, fabric 12 may include regions 46, 48, 50, 52, 56, and 58. Regions 46, 48, 50, 52, 56, and 58 may have one or more different properties. Properties of fabric 12 that may be varied across different regions of fabric 12 include fabric construction (e.g., spacer fabric, single layer fabric, knit fabric, woven fabric, braided fabric, etc.), number of strands in a given area, the size of the individual strands, the spacing between adjacent strands (porosity or fiber density), thickness, elasticity, strand denier, the type or material of strands being used (e.g., metal, polymer, elastomer, insulating, conductive, abrasion-resistant, elastic, non-elastic, fusible, strong, magnetic, monofilament, multifilament, etc.), an amount and/or type of binder (e.g., thermoplastic material and/or other polymer material) incorporated, and other suitable properties.

An illustrative example of the different types of properties that these regions may have is described below. Arrangements in which fabric 12 has other combinations of properties may be used, if desired.

Region 46 may be a spacer fabric region that makes up the bulk of fabric 12. In some arrangements, region 46 may be a component-free region that is free of components, or region 46 may have fewer components than other regions of fabric 12. Because region 46 makes up the bulk of fabric 12 and makes contact with a wider surface area of the user's wrist (in arrangements where fabric 12 forms a wrist strap), it may be desirable to form region 46 with certain cosmetic properties, a certain feel, and/or a certain amount of stretch to accommodate different wrist sizes. For example, region 46 may be formed from a knit spacer fabric formed from intertwined strands of stretchable material (e.g., material with a relatively low elasticity modulus). This type of fabric construction and strand material may provide a pleasant cushiony feel, breathability, elasticity (stretchability), and pleasant appearance in region 46.

Region 46 may transition to region 48, where component 66 is located. Region 48 may include one or more cavities (e.g., pockets, voids, gaps, etc.) such as pocket 86 for receiving component 66. To protect components in region 48 such as component 66, region 48 may incorporate more binder than region 46, may incorporate stiffeners such as molded thermoplastic material, elastomer, metal structures, epoxy, etc., may be less porous than region 46 (e.g., may have a greater strand density and/or may incorporate gap-filling thermoplastic), may use strands of different material than region 46 (e.g., may use strands with a higher elasticity modulus than the strands of region 46), and/or may have other properties that are different from region 46 to accommodate component 66. Stiffening materials such as thermoplastic may be molded only around component 66 and/or may be incorporated throughout region 48, if desired.

The opposing edges of regions 46 and 48 may be lined with edge structures 64. Edge structures 64 may be stitching (e.g., one or more strands that are stitched along the edges of regions 46 and 48), may be hollow tubes (e.g., tubes of polymer, fabric tubes, elastomeric tubes, and/or other tubes), may be tubes that contain a material inside (e.g., silicone, nylon, shape memory alloy, metal, etc.), and/or may be other suitable edge structures. Edge structures 64 may be purely cosmetic (e.g., to provide a desired look and feel) or may have functionality (e.g., one or more strands in edge structures 64 may be used to adjust the fit of strap 30 on a user's wrist). Arrangements in which edge structures 64 are omitted may also be used.

Region 50 may have one or more open edges such as open edge 50E for inserting component 66 into fabric 12 towards pocket 86. Edges 50E of region 50 may be free of edge structures 64 to provide an opening through which component 66 may be inserted into fabric 12. If desired, region 50 may incorporate fusible strands of material that melt and fuse upon application of heat. After component 66 is integrated into fabric 12 and fabric 12 is trimmed, heat may be applied to the fusible strands in region 50 to seal the end of fabric 12 (e.g., to seal pocket 86). This is, however, merely illustrative. If desired, injected thermoplastic, stitching, adhesive, welds, overmolded plastic, or other attachment materials may be used to seal the end of fabric 12 and/or to seal pocket 86.

If desired, other properties of region 50 such strand material and rigidity may be similar to that of region 48.

Region 50 may transition to region 52. Region 52 may incorporate alignment features such as alignment holes 54. Alignment holes 54 may, for example, be configured to receive corresponding alignment posts on a processing tool to help align fabric 12 with respect to the processing tool. If desired, other alignment features may be incorporated into region 52 such as different color threads, raised bumps, and/or other features that can be registered with a visual system during processing. Alignment features in region 52 may be used to align fabric 12 to processing equipment during manufacturing and/or to align components such as component 66 to fabric 12. Region 52 may be a sacrificial alignment region that is removed during manufacturing, or region 52 may be a non-sacrificial alignment region that remains with fabric 12. In arrangements where region 52 is a sacrificial alignment region, which is sometimes described herein as an illustrative example, region 52 may be trimmed away from the remaining portions of fabric 12 using trimming equipment (e.g., mechanical trimming equipment 42 of FIG. 5 and/or laser trimming equipment 40 of FIG. 5). Arrangements in which region 52 incorporates dissolvable strands such as strands formed from water-soluble, chemical-soluble, biodegradable, or meltable material that can be easily removed after fabric 12 is formed may also be used. For example, strands of fabric 12 may include water-soluble yarn (e.g., polyvinyl alcohol, ethanol, or other water-soluble material) that is removed from fabric 12 after alignment features 54 are no longer needed, if desired.

Region 56 may be an additional alignment region for aligning fabric 12 with respect to a tool during processing. Region 56 may, for example, include a hollow tube that receives a corresponding rod on a tool. During manufacturing, fabric 12 may be aligned to the tool by inserting an elongated rod on the tool into the tube of region 56 and inserting pins on the tool into alignment holes 54 of region 52. This is merely illustrative, however. If desired, other alignment features may be incorporated into region 56 or region 56 may be omitted.

Region 58 may be extra material (e.g., salvage) to be trimmed away during manufacturing.

A cross-section of fabric 12 of FIG. 6 taken along line 60 and viewed in direction 62 is shown in FIG. 7. As shown in FIG. 7, region 46 may include outer fabric layers 94-1 and 94-2 joined by spacer layer 94-3. Layers 94-1 and 94-2 may be warp knit or weft knit fabrics, each formed with its own set of intertwined strands 20. Layers 94-1 and 94-2 may have the same construction and material or may have different constructions and materials. Spacer layer 94-3 includes strands that intertwine with strands of layers 94-1 and 94-2 to join the two layers together. The width W between layers 94-1 and 94-2 may be between 1 mm and 15 mm, between 5 mm and 10 mm, between 20 mm and 30 mm, less than 1 mm, less than or greater than 15 mm, greater than 30 mm, or other suitable width.

If desired, spacer layer 94-3 may extend into region 48, as shown in FIG. 7, or may be omitted from region 48. In region 50, some or all of inner spacer layer 94-1 may be omitted to create an opening for component 66 to be inserted into pocket 86.

If desired, region 50 may incorporate fusible strands of material that melt and fuse upon application of heat. After component 66 is integrated into fabric 12 and fabric 12 is trimmed, heat may be applied to the fusible strands in region 50 to seal the end of fabric 12 (e.g., to seal pocket 86) and fuse layers 94-1 and 94-2 together. This is, however, merely illustrative. If desired, thermoplastic material, stitching, adhesive, welds, overmolded plastic, or other attachment materials may be used to create a seam between layers 94-1 and 94-2.

FIG. 7 also shows alignment holes 54 passing through region 52. Alignment holes 54 may have a diameter between 3 mm and 5 mm, 2 mm and 6 mm, 1 mm and 4 mm, less than 10 mm, greater than 5 mm, or other suitable diameter.

Region 56 forms a tube having a hollow interior region such as hollow region 96. Hollow region 96 may be configured to receive a rod or other elongated tool part during manufacturing to align fabric 12 with respect to the tool. Region 56 may be a fabric tube and/or may incorporate non-fabric components such as metal, polymer, elastomer, etc.

As shown in FIG. 7, fabric 12 may transition from a multi-layer fabric (e.g., a spacer fabric) in regions 46, 48, and 50, to a single layer fabric (e.g., a single layer flat knit fabric) in region 52. If desired, all of region 52 may be removed during manufacturing, all of region 52 may remain untrimmed, or region 52 may be trimmed so that alignment features 54 are removed while leaving a remaining portion of region 52 in place.

FIG. 8 is a top view of illustrative processing equipment that may be used to process fabric 12 of item 10 during manufacturing. As shown in FIG. 8, processing equipment 98 for processing fabric 12 may include control circuitry 100, vision system 92, equipment 44, and fixture 68.

Vision system 92 may be a computer vision system (sometimes referred to as a machine vision system) having or more sensors for capturing information about fabric 12. Sensors in vision system 92 may, for example, include one or more cameras (e.g., digital image sensors that capture visible image data and/or infrared mage data), three-dimensional image scanners (e.g., equipment that captures depth information from fabric 12 and that produces a three-dimensional model of fabric 12 based on the captured depth information), range sensors, radar, ultrasonic cameras, and/or other sensors for gathering information about fabric 12. Information captured by sensors in vision system 92 may be provided to control circuitry 100 (sometimes referred to as computing equipment or a control unit). Control circuitry 100 may process the sensor data to extract fabric features and/or other alignment features and may send control signals to equipment 44 (e.g., equipment of the type shown in FIG. 5) based on the received sensor data.

Processing equipment 44 may be used to apply heat to fabric 12, to trim fabric 12, to insert components such as component 66 into fabric 12, to inject plastic into or onto fabric 12, to add stitching to fabric 12, to add coatings to fabric 12, to emboss, deboss, heat-process, or otherwise form fabric 12, and/or to perform other processing operations on fabric 12. If desired, some or all of vision system 92 may form part of control circuitry 100 and/or some or all of control circuitry 100 may form part of vision system 92. Processing equipment 44 may include one or more computer-controlled positioners that receives control signals from control circuitry 100 based on sensor data from vision system 92.

Fabric 12 may be supported and held in place by fixture 68 during processing operations (e.g., while vision system 92 gathers image data, depth data, and/or other data about fabric 12, while equipment 44 inserts components into fabric 12, while equipment 44 trims fabric 12, etc.). In some arrangements, fixture 68 may include one or more light sources for illuminating fabric 12 and/or one or more heat sources for applying heat to fabric 12. Heat sources in fixture 68 may, for example, be used to melt thermoplastic around component 66 (e.g., to form a mold cap and/or to otherwise encapsulate component 66), to melt thermoplastic or fusible strands to seal pockets and/or to seal end portions of fabric 12 after trimming, to melt solder and thereby mechanically and electrically couple component 66 to conductive strands in fabric 12 (e.g., in arrangements where component 66 is an electronic component), to apply heat during debossing or other heat-based forming operations, and/or to apply heat during other processing operations.

Sensor data from vision system 92 may be analyzed by control circuitry 100 (and/or analyzed by processing circuitry that forms part of vision system 92) to determine where fabric 12 should be trimmed, where debossing or other heat-based forming operations should occur on fabric 12, where heat should be applied to fabric 12, where mechanical and/or electrical components should be placed on and/or inserted into fabric 12, etc. Control circuitry 100 may send corresponding control signals to equipment 44.

For example, trimming equipment in equipment 44 may include a laser that cuts along a cutting path determined by control circuitry 100 based on data from system 92. The laser may be an infrared laser (e.g., a carbon dioxide laser operating at a wavelength of 9.6 microns) or a visible light laser (e.g., a laser operating at a wavelength of approximately 532 nanometers). If desired, equipment 44 may use a different cutting tool to trim fabric 12 such as die cutting tool, a blade cutting tool, or other suitable cutting tool.

If desired, alignment features may be formed on fabric 12, component 66, and/or fixture 68 for ensuring that processing operations occur at the appropriate location on fabric 12. Alignment features may be visual alignment features captured by vision system 92 and/or may be mechanical alignment structures for mechanically aligning processing operations relative to fabric 12. For example, component 66 may include alignment features 74, fabric may include alignment features 102, and fixture 68 may include alignment posts 72 and alignment rod 70. Alignment features 74 on component 66 may be mechanical alignment features such as pins which may be used as datums for processing equipment 44 (e.g., fabric 12 may be debossed or otherwise heat-processed in a precise location relative to component 66 using pins on component 66). Alignment features 102 on fabric 12 may include colored threads, raised fabric portions, metal alignment features, or other suitable alignment features. Alignment posts 72 of fixture 68 may serve as visual markers and mechanical alignment structures, if desired. For example, alignment posts 72 may be captured with vision system 92 and may indicate the position of fabric 12. Pins 72 may also be inserted into alignment holes 54 of fabric 12 and may properly align fabric 12 to fixture 68. Alignment rod 70 may pass through opening 96 in portion 56 of fabric 12 and may be used to keep fabric 12 taught and prevent bowing.

In one illustrative arrangement, fabric 12 is initially free of components and is placed on fixture 68 by inserting rod 70 into opening 96 of region 56 and inserting pins 72 into holes 54 of region 52. After placing fabric 12 on fixture 68, component 66 is inserted through open end 50E of region 50 and placed in pocket 86 of region 48. Fixture 68 may then be used to apply heat and pressure to bond component 66 to fabric 12 in region 48. This may be a purely mechanical bond (e.g., in arrangements where component 66 is a mechanical structure such as attachment module 90 or other mechanical structure 14), or this may be a mechanical and electrical bond (e.g., a solder connection in arrangements where component 66 is an electronic component such as component 32 or other circuitry 16).

After component 66 is bonded to fabric 12, stiffening material may be incorporated into regions such as regions 52, 56, and/or 58. For example, thermoplastic may be melted in regions 52, 56, and/or 58 and may fill the pores of fabric 12 and create a seal at the end portions of fabric 12. Equipment 44 may then be used to deboss or otherwise heat-process desired regions of fabric 12. If desired, debossing operations, heat-based forming operations, and other processing operations (cutting, welding, applying heat, etc.) may be performed on fabric 12 using alignment features 74 (e.g., pins or other protrusions) on component 66 as datums. This may ensure that debossing, other heat-based forming operations, and other processing operations occur at the appropriate location on fabric 12 relative to component 66. This may also ensure that components on the exterior surface of fabric 12 (sometimes referred to as exterior components) are properly aligned with respect to the components inside of fabric 12 (sometimes referred to as interior components). Exterior components such as trim members, mechanical structures (friction pads, spring pins, etc.), and/or electrical components may be attached, welded, or otherwise mounted in the debossed or otherwise heat-processed regions of fabric 12. If desired, exterior components may be welded or otherwise coupled to interior components through fabric 12.

When alignment features in fabric 12 are no longer needed, fabric 12 may be trimmed or dissolvable strands may be dissolved to remove the sacrificial portions of fabric 12 (e.g., regions 52, 56, and/or 58). If desired, fixture 68 may apply heat and pressure to smooth fabric 12 and/or melt thermoplastic or fusible strands along the edge of fabric 12 to create a smooth seam.

FIGS. 9 and 10 are cross-sectional side views of item 10 with different seam configurations. In the example of FIG. 9, outer fabric layers 94-1 and 94-2 are joined by seam 76, which is located in an end region of fabric 12 where layers 94-1 and 94-2 meet. In the example of FIG. 10, seam 76 is located not at the end region but on a lower portion of item 10. Arrangements in which seam 76 is located on an upper portion of item 10 may also be used. Seam 76 may be a fused seam (e.g., fused thermoplastic covering the ends of fabric 12 and/or fused strands at the ends of fabric 12). Seam 76 may be plastic, metal, and/or may have a uniform fabric pattern (e.g., where holes or other patterns in layer 94-1 align with corresponding holes or other patterns in layer 94-2).

FIGS. 11 and 12 are perspective views of item 10 (e.g., when item 10 forms a strap such as strap 30 of FIG. 4) after attachment module 90 has been integrated into fabric 12. If desired, attachment module 90 may be coupled to component 66 (e.g., component 66 of FIG. 8 which is embedded in a pocket in fabric 12), may form part of component 66, may be aligned with respect to component 66, and/or component 66 may be an electrical component that is separate from attachment module 90. Arrangements in which attachment module 90 is coupled to component 66 in fabric 12 are sometimes described herein as an example.

As shown in FIG. 11, attachment module 90 may include trim member 78, spring member 82 (e.g., a spring pin or other mechanical structure), and friction pads 80. When it is desired to attach strap 30 to device housing 28, the end portion of fabric 10 containing attachment module 90 may slide into a channel in housing 28. Spring member 82 may be depressed within the channel until it reaches a recess within the channel, at which point spring member 82 may spring outward and into the recess, thereby locking strap 30 in place on housing 28.

Spring member 82 and friction pads 80 may be mounted in openings in trim member 78. Trim member 78 may be a metal or plastic trim member that is coupled to component 66 through fabric 12 (e.g., via laser welding, crimped metal connections, adhesive, overmolded plastic, fasteners, etc.). If desired, trim member 78, spring member 82, and/or friction pads 80 may be located in debossed or otherwise heat-processed regions of fabric 12.

In the example of FIG. 12, individual trim members 84 surround spring member 82 and friction pads 80. Trim members 84 may be metal or plastic trim members that are coupled to component 66 through fabric 12 (e.g., via laser welding, crimped metal connections, adhesive, fasteners, etc.). If desired, trim members 84, spring member 82, and/or friction pads 80 may be located in debossed or otherwise heat-processed regions of fabric 12.

The foregoing is merely illustrative and various modifications can be made to the described embodiments. The foregoing embodiments may be implemented individually or in any combination.

What is claimed is:

1. A strap for an electronic device having opposing first and second sides, the strap comprising:
    fabric comprising first and second opposing ends that respectively couple to the first and second sides of the electronic device, wherein the fabric comprises a pocket at the first end; and
    an attachment module located at the first end that removably attaches the first end to the first side, wherein the attachment module has an exterior component on an exterior surface of the fabric and an interior component located in the pocket, wherein the pocket is sealed and wherein the exterior component is attached to the interior component using an attachment structure.

2. The strap defined in claim 1 wherein the attachment structure is selected from the group consisting of: a laser weld, adhesive, and overmolded plastic.

3. The strap defined in claim 1 wherein the fabric has heat-processed regions and wherein the exterior component is at least partially located in the heat-processed regions.

4. The strap defined in claim 1 wherein the fabric has debossed regions, wherein the exterior component is at least partially located in the debossed regions, wherein the interior component comprises alignment features, and wherein the debossed regions are aligned with respect to the alignment features.

5. The strap defined in claim 1 wherein the exterior component of the attachment module comprises a trim member having an opening and a spring member located in the opening.

6. A strap for an electronic device, the strap comprising:
    a fabric having at least first and second regions, wherein the second region is more rigid than the first region and contains a pocket;
    an attachment module comprising an interior component mounted in the pocket and an exterior component located on an exterior surface of the fabric, wherein the exterior component is attached to the interior component using an attachment structure, the interior component comprises alignment features, the pocket is sealed, and the attachment module is configured to attach the item to an electronic device; and
    a third region in the fabric that is aligned with respect to the alignment features.

7. The strap defined in claim 6 wherein the fabric comprises a spacer fabric.

8. The strap defined in claim 7 wherein the third region comprises a debossed region and wherein the attachment module comprises a spring member located in the debossed region.

9. The strap defined in claim 8 wherein the attachment module comprises a trim member having at least one opening, wherein the spring member is located in the at least one opening, and wherein the trim member comprises a material selected from the group consisting of: plastic and metal.

10. The strap defined in claim 6 further comprising molded polymer in the second region.

11. The strap defined in claim 10 wherein the molded polymer seals the pocket with a seam located along an edge of the fabric.

12. The strap defined in claim 6 wherein the alignment features are selected from the group consisting of: raised regions, recessed regions, and alignment pins.

13. The strap defined in claim 6 wherein the first region has at least one characteristic that is different from the second region and wherein the at least one characteristic is selected from the group consisting of: porosity, density, thickness, elasticity, strand material, and fabric construction.

14. A strap for an electronic device, the strap comprising:
a fabric having first and second regions and having a pocket in the second region; and
an attachment module comprising an interior component in the pocket and an exterior component located on an exterior surface of the fabric, wherein the exterior component is attached to the interior component using an attachment structure," after "wherein" and before "the pocket the pocket is sealed, the second region is stiffer than the first region, and the fabric of the second region selected from the group consisting of: debossed fabric, heat-processed fabric, and fused fabric.

15. The strap defined in claim 14 wherein the attachment module is configured to attach the strap to an electronic device.

16. The strap defined in claim 15 wherein the fabric comprises multi-layer spacer fabric having first and second outer layers joined by a spacer layer.

17. The strap defined in claim 16 further comprising:
stiffening material that is located in the second region and not the first region of the multi-layer fabric; and
a seam located along an edge of the multi-layer fabric that encloses the interior component in the pocket.

18. The strap defined in claim 14 wherein the first region has at least one characteristic that is different from the second region and wherein the at least one characteristic is selected from the group consisting of: porosity, density, thickness, elasticity, strand material, and fabric construction.

\* \* \* \* \*